Patented Sept. 27, 1949

2,482,888

UNITED STATES PATENT OFFICE 2,482,888

ORGANIC SILICON COMPOUNDS FOR DEWEBBING ELASTOMER LATICES

Robert H. Walsh, Woodstown, N. J., assignor to E. I. du Pont de Nemours & Company, Wilmington, Del., a corporation of Delaware No Drawing. Application June 21, 1946, Serial No. 678,351

5 Claims. (Cl. 260—28.5)

1

This invention relates to the art of compounding elastomer latices for use in making articles by dipping processes.

In the preparation of articles such as gloves and wire baskets by dipping processes, webs of latex are often formed between surfaces of the form which are approximately parallel and close together. For example, in the praparation of gloves, webs form between the fingers as the glove form is removed from the latex bath. These break with something of a snap, causing a ridge to form on either side of the fingers and a small hole or thin spot to form in the crotch. These imperfections make the finished article unsalable as first-class merchandise. Webbing is particularly troublesome in synthetic latices which are made with soap-like emulsifying agents. No entirely satisfactory method is known in the art for avoiding this webbing phenomena.

There have been several methods proposed for dewebbing natural rubber latex which have met with various degrees of success. For example, a relatively small amount of certain oils and waxes, when added to rubber latex, prevents webbing. Small amounts of these waxes, however, will not deweb synthetic latex. If large amounts of these same agents are used, the latex is dewebbed for a short time but the addition of such large amounts of oils and waxes has two undesirable effects. They tend to make the latex unstable, and they "bloom" upon the surface, leaving an oily, waxy scum which makes the finished article unsightly.

The object of this invention is to develop compounded latices having a much reduced tendency to web even after storage, and giving films free from blisters and "bloom." A further object is to develop stable, easily handled compositions to be added to the latex to achieve these objects.

These objects are accomplished according to the present invention by incorporating in the latex a small amount of an alkylated organo-silicon compound selected from the polymeric dimethyl silicone greases and the lower alkyl silicon trichlorides. Preferably, the alkyl group contains 1 to 6 carbon atoms. The preferred agent is normal-butyl silicon trichloride.

The silicon compound is emulsified in water, preferably after being first dissolved or dispersed in an oil. A small amount of this emulsion is incorporated into the latex for the prevention of webbing. The emulsion used for dewebbing preferably also contains a mineral wax such as montan wax or ceresin.

The following examples are given to illustrate the invention. The parts used are by weight, unless otherwise designated.

EXAMPLE 1

An emulsion containing n-butyl silicon trichloride and used for preventing the webbing of latex had the following composition:

Part A

| | Parts |
|---|---|
| n-Butyl silicon trichloride | 3 |
| Refined aliphatic hydrocarbon fraction in kerosene range ("Dependip") | 27 |

Part B

| | |
|---|---|
| Ceresin wax | 15 |
| Light lubricating oil ("Circo light process oil") | 150 |

Part C

| | |
|---|---|
| Aqueous 10% solution of the sodium salts of sulfonated higher fatty alcohols, chiefly $C_{12}$ and $C_{14}$ | 69 |
| Aqueous 10% solution of ammoniacal casein | 150 |
| Water | 60 |

To prepare this emulsion, the following typical procedure was used:

1. The n-butyl silicon trichloride was dissolved in the solvent ("Dependip"). (Part A.)
2. The wax was added to the oil and the mixture was heated at 170° F. until the wax was dissolved. (Part B.)
3. The water, ammoniacal casein solution and emulsifying agent were heated in another container to 200° F. (Part C.)
4. The solvent solution of n-butyl silicon trichloride (A) was added to the heated oil-wax mixture (B) with constant stirring.
5. The oil-wax-silicon mixture was added to the water phase (C) on a high speed stirrer.
6. The emulsion was finally passed through a tightly set colloid mill.
7. It is preferred to allow the emulsion to cool before using.

This emulsion was used to treat a 50% neoprene (polychloroprene) latex made substantially according to Example 25 of U. S. Patent 2,264,173. As prepared, this latex showed pronounced webbing, but, when 1.25 parts of the above emulsion were mixed with each 100 parts of the 50% neoprene latex (that is, one part of the butyl silicon trichloride-wax-oil mixture, or 0.018 part of butyl silicon trichloride per 100 parts of neoprene), no webbing was observed. The treated latex was stored for 18 days before a tendency to web appeared. At this point, the addition of 0.31 part more of the dewebbing emulsion per 100 parts of latex prevented webbing for 7 days more. Beyond this, 0.63 part more of dewebbing emulsion prevented webbing for an additional 8 days. The treated latex throughout had satisfactory wetting properties and gave films from which the small amounts of oil and wax present did not bloom. The 33 days during which the treated latex was free from webbing is ample in almost all practical cases but may be further extended, if necessary, by adding further small amounts of the dewebbing emulsion. On the other hand, when the butyl silicon trichloride was omitted from the above dewebbing emulsion, 7 parts of the wax-oil mixture per 100 parts of neoprene had to be added to the latex in order to prevent webbing, the dewebbing action lasted only 7 days, the treated latex tended to become unstable, and dipped goods made from it had an undesirable bloom of oil and wax on the surface.

EXAMPLE 2

The emulsion described above also effectively dewebs compounded neoprene latex. For example, the addition of 2 parts (per 100 parts of neoprene in the compound) of this emulsion described above dewebbed a neoprene latex mix compounded with zinc oxide, phenyl-beta-naphtholamine, casein, and sulfated methyl oleate for a period of 14 days. The further addition of a small amount of emulsion dewebbed the compound for an additional 7 days.

In order to produce specific properties in articles produced from neoprene latex, it is frequently necessary to add compound ingredients other than the zinc oxide and antioxidants used above. Large amounts of fillers such as clay, whiting, and blanc fixe, etc., and oils, waxes, etc., are frequently used. n-Butyl silicon trichloride-oil-wax emulsion will deweb such compounds, although a larger amount must be used than with so-called gum or lightly loaded compounds.

EXAMPLE 3

A synthetic latex, made by copolymerizing approximately equal parts of butadiene and styrene dispersed in a potassium rosinate solution, was treated with the butyl silicon trichloride emulsion described in Example 1. Using the same proportions as specified in the example, a very similar dewebbing effect was obtained. The dewebbing emulsion was also effective for natural rubber latex.

EXAMPLE 4

The polymeric dimethyl silicone greases are also very effective in preventing webbing. An emulsion made for this purpose, containing one of these polymeric greases (sold by the Dow-Corning Corporation under the designation "Dow-Corning Stopcock Grease"), was made according to the following formula:

Part A

| | Parts |
|---|---|
| Stopcock grease | 3 |
| Kerosene | 27 |

Part B

| | Parts |
|---|---|
| Ceresin wax | 15 |
| Light lubricating oil (Circo light process oil) | 150 |

Part C

| | |
|---|---|
| Aqueous 10% solution of the sodium salts of sulfonated higher fatty alcohols (chiefly $C_{12}$ and $C_{14}$) | 69 |
| Aqueous 10% solution of ammoniacal casein | 150 |
| Water | 60 |

The grease was first dispersed in the kerosene by heating and passing through a colloid mill (Part A). The wax was then dissolved in the oil (part B), which was then mixed with the grease dispersion and dispersed in the aqueous ingredients (Part C) of the formula, as in Example 1. The 50% neoprene latex used in Example 1 was treated with this emulsion, 2.5 parts of the latter being needed for 100 parts of the 50% latex to give freedom from webbing for 18 days. This corresponds to 2 parts of the silicone-wax-oil mixture, or 0.036 part of silicone per 100 parts of neoprene.

The present invention may be applied to any aqueous dispersions of rubber or rubber-like materials which are referred to in this specification as elastomers, but is especially useful for those which contain dispersing agents of a soap-like character, such as the alkali metal salts of high molecular weight carboxylic (e. g., abietic and oleic) or sulfonic acids or the alkali metal sulfates of long chain aliphatic alcohols, where webbing is an important problem. The dispersed elastomers may be polymers of 1,3-butadiene, chloroprene, or copolymers of these with not more than equal amounts of styrene, acrylic nitrile, methyl methacrylate, vinylidene chloride, and other polymerizable vinylidene compounds.

Although the organo-silicon compounds by themselves have a powerful dewebbing effect, it has been found advantageous to introduce them in the form of aqueous emulsions of oils in which they are, in turn, dissolved or dispersed. In this way, stable, effective, easily handled compositions for preventing webbing are easily made. The oil may be either mineral, vegetable or animal, for example, a light paraffin base lubricating oil, rape seed oil or lard oil. Dispersion of the silicon compound in the oil is made easier by first dissolving or dispersing it in a volatile hydrocarbon, such as kerosene. It has also been found that incorporating a mineral wax, such as montan wax or ceresin, into the dewebbing composition improves the working properties of the treated latex, which tend to be adversely affected by the organo-silicon compounds. Ordinarily, the silicon compound may be dispersed in from 20 to 200 times its weight of oil, containing a quantity of wax equal to from 2 to 20 times the weight of the silicon. From 0.1 to 10 parts of these mixtures are used per 100 parts of elastomer. The most useful proportions of the silicon compounds are between 0.001 and 0.1 part per 100 parts of elastomer. In emulsifying these mixtures in water so that they may be conveniently added to the latices, any emulsifying solution compatible with that of the latex may be used. In the case of the alkyl silicon trichlorides, it is desirable to have the dispersing solution slightly alkaline in order to neutralize the hydrochloric acid which may be formed by the hydrolysis. Otherwise, local coagulation of the latex may occur. The concentration of emulsion is suitably between 30% and 50%.

I claim:

1. In the process for producing articles by a dipping process from a latex bath of an elastomer of the class consisting of polymers of 1,3-butadiene, chloroprene and co-polymers of the same with not more than equal amounts of co-polymerizable vinylidene compounds, which bath contains a soap-like emulsifying agent, the step which comprises reducing the tendency of the elastomer to web by incorporating in the latex bath a non-acidic aqueous emulsion of a light mineral oil solution of an alkylated organo-silicon compound of the class consisting of grease-like polymeric dimethyl silicones and alkyl silicon trichlorides in which the alkyl group contains from 1 to 6 carbon atoms, the amount of the silicon compound contained in the emulsion of the mineral oil solution which is added being from 0.001 to 0.1 part per 100 parts of elastomer in the latex bath.

2. In the process for producing articles by a dipping process from a latex bath of an elastomer of the class consisting of polymers of 1,3-butadiene, chloroprene and co-polymers of the same will not more than equal amounts of co-polymerizable vinylidene compounds, which bath contains a soap-like emulsifying agent, the step which comprises reducing the tendency of the elastomer to web by incorporating in the latex bath a non-acidic aqueous emulsion of a light mineral oil solution of a mineral wax and an alkylated organo-silicon compound of the class consisting of grease-like polymeric dimethyl silicones and alkyl silicon trichlorides in which the alkyl group contains from 1 to 6 carbon atoms, the amount of the silicon compound contained in the emulsion of the mineral oil solution which is added being from 0.001 to 0.1 part per 100 parts of elastomer in the latex bath, and the amount of mineral wax contained in the emulsion being from two to twenty times the weight of the silicon compound added.

3. In the process for producing articles by a dipping process from a latex bath of polychloroprene, which bath contains a soap-like emulsifying agent, the step which comprises reducing the tendency of the polychloroprene to web by incorporating in the latex bath a non-acidic aqueous emulsion of a light mineral oil solution of an alkylated organo-silicon compound of the class consisting of grease-like polymeric dimethyl silicones and alkyl silicon trichlorides in which the alkyl group contains from 1 to 8 carbon atoms, the amount of the silicon compound contained in the emulsion of the mineral oil solution which is added being from 0.001 to 0.1 part per 100 parts of the polychloroprene in the latex bath.

4. In the process for producing articles by a dipping process from a latex bath of an elastomer of the class consisting of polymers of 1,3-butadiene, chloroprene and co-polymers of the same with not more than equal amounts of co-polymerizable vinylidene compounds, which bath contains a soap-like emulsifying agent, the step which comprises reducing the tendency of the elastomer to web by incorporating in the latex bath a non-acidic aqueous emulsion of a light mineral oil solution of normal-butyl silicon trichloride, the amount of the butyl-silicon trichloride contained in the emulsion of the mineral oil solution which is added being from 0.001 to 0.1 part per 100 parts of the elastomer in the latex bath.

5. In the process for producing articles by a dipping process from a latex bath of polychloroprene, which bath contains a soap-like emulsifying agent, the step which comprises reducing the tendency of the polychloroprene to web by incorporating in the latex bath a non-acidic aqueous emulsion of a light mineral oil solution of normal-butyl silicon trichloride, the amount of the butyl silicon trichloride contained in the emulsion of the mineral oil solution which is added being from 0.001 to 0.1 part per 100 parts of the polychloroprene in the latex bath.

ROBERT H. WALSH.

REFERENCES CITED

The following references are of record in the file of this patent:

UNITED STATES PATENTS

| Number | Name | Date |
|---|---|---|
| 2,375,007 | Larsen et al. | May 1, 1945 |
| 2,383,521 | Sowa | Aug. 28, 1945 |
| 2,392,805 | Biefeld | Jan. 15, 1946 |

Certificate of Correction

Patent No. 2,482,888  September 27, 1949

ROBERT H. WALSH

It is hereby certified that error appears in the printed specification of the above numbered patent requiring correction as follows:

Column 6, line 2, for "1 to 8 carbon atoms" read *1 to 6 carbon atoms*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*